United States Patent [19]

Breuckner

[11] 4,297,165
[45] Oct. 27, 1981

[54] FUEL PELLETS FOR CONTROLLED NUCLEAR FUSION

[75] Inventor: Keith A. Breuckner, San Diego, Calif.

[73] Assignee: KMS Fusion, Inc., Ann Arbor, Mich.

[21] Appl. No.: 65,756

[22] Filed: Jul. 13, 1970

[51] Int. Cl.³ ............................................. G21B 1/00
[52] U.S. Cl. .................................... 376/103; 376/152
[58] Field of Search ........................................ 176/1-9

[56] References Cited

U.S. PATENT DOCUMENTS

| | | | |
|---|---|---|---|
| 3,094,474 | 6/1963 | Gale | 176/1 |
| 3,107,211 | 10/1963 | Mallinekrodt | 176/1 |
| 3,303,097 | 2/1967 | Mallinekrodt | 176/1 |
| 3,378,446 | 4/1968 | Whittlesey | 176/1 |
| 3,489,645 | 1/1970 | Daiber et al. | 176/1 |

FOREIGN PATENT DOCUMENTS

| | | | |
|---|---|---|---|
| 1259375 | 3/1961 | France | 176/1 |
| 841387 | 7/1960 | United Kingdom | 176/1 |
| 851355 | 10/1960 | United Kingdom | 176/1 |

OTHER PUBLICATIONS

Legislative History of the Atomic Energy Act of 1954, vol. III, pp. 2849, 2859.
Nuclear Fusion, vol. 10, 1970, by Linhart, pp. 211, 212, 222, 225, 226.
Popular Science 12/76, pp. 66-71, 148, 150.
Laser Focus 5/77, p. 6.
UCRL-50021-75, Mar, 1976, p. 25.
1954 U.S. Code Congressional and Administrative News, pp. 3466, 3467, 3480, 3532.
Legislative History of the Atomic Energy Act of 1954, vol. II, pp. 1759, 2305, 2373, 2374.
Fortune, Dec. 1974, pp. 149, 152.
New York Times, Jan. 30, 1973, p. 21
Nuclear News, 3/78, pp. 30-35.
FTD-HT-66-422, 3/67, by Chao et al., pp. 1-9.
Nature, vol. 258, 12/75, pp. 512-514.
National Defense, May-Jun. 1978, pp. 538-543, 580-582, 584.
Microwaves, 1969 (Laser News) "Laser for H-bomb Trigger?", pp. 122, 123.
Marwick, "Exploding Reactors for Power", 1/33, pp. 17-19, 26, 27, 38.
NSENAO-58, No. 2, 10/75, pp. 107, 108, 118, 119.
ERDA-28, 1/75, pp. 1-3, 8-10.
Nuclear News, 5/75, pp. 79, 80.

*Primary Examiner*—Harvey E. Behrend
*Attorney, Agent, or Firm*—Barnes, Kisselle, Raisch & Choate

[57] ABSTRACT

In connection with a fusion process which can be initiated by a high energy input such as a laser beam, the use of a layer of uranium surrounding the fusion fuel such as deuterium-tritium or a non-cryogenic fuel such as lithium deuterium-lithium tritium. The uranium serves as a tamper layer to contain the fusion fuel and supplement the heating by a fission reaction which not only increases the fusion yield but increases the time of disassembly, thus materially increasing the efficiency of the fusion system.

7 Claims, 1 Drawing Figure

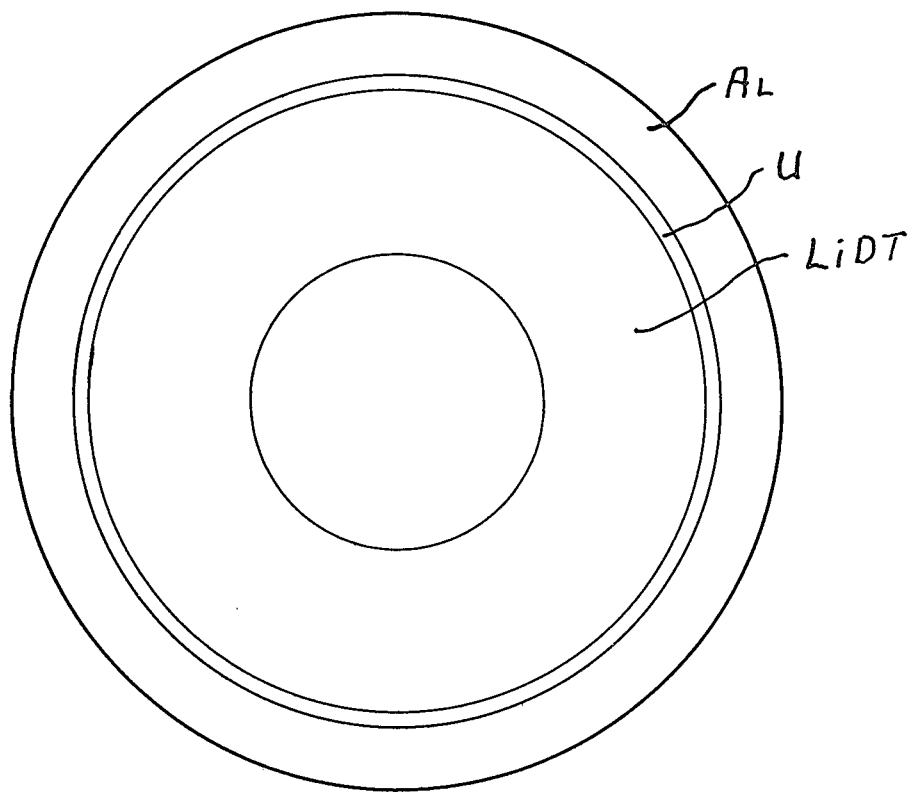

FUEL PELLETS FOR CONTROLLED NUCLEAR FUSION

This invention relates to Fuel Pellets for Controlled Nuclear Fusion and more particularly to an improved pellet for use in fusion systems utilizing a localized high energy input such as that which can be produced by a laser beam.

In my co-pending application Ser. No. 12,624, filed Feb. 20, 1970, on Fuel Pellets for Controlled Nuclear Fusion, and now continued into my co-pending application Ser. No. 337,094, filed Mar. 2, 1973, there are described fuel pellets of varying types and more particularly those having either an initially and/or, during the fusion process, a surrounding layer of high density plasma which has a tamping effect on the contained fusion fuel and improves the efficiency of the burn. This may be an outer shell of beryllium or lithium hydride, which when heated will have considerable burn-off but leaves a surviving layer which is driven into the high density plasma. It may also be a layer of high density material such as gold, tungsten or uranium underlying the burn-off material which enhances the function of retarding fuel expansion after ignition and also serves to recompress the fuel after ignition to increase the burn time by a factor of a few to an order of magnitude. The increased efficiency and the effect of the "alpha-particle produced" implosions, as well as Design and Computational Details, are described in the referenced application.

The present invention relates to a discovery of the effect of the use of uranium as a tamper (outer shell) in the fuel pellet design. It is an object to simplify the initial fusion stage by reducing the size and output of the laser and thus reduce the cost and complexity of the entire system.

It is a further object of the invention to increase the overall efficiency of the fuel burn-up which increases the ultimate yield.

Other objects and features of the invention relating to details of materials and construction will be apparent in the following description and claims in which the principles of operation, together with the best mode presently contemplated for the invention, are disclosed.

A DRAWING accompanies the invention in which the single FIGURE illustrates diagrammatically a fuel pellet constructed according to the present invention.

The discovery of the present invention is that a small amount of uranium, even $U^{238}$, a depleted uranium by product, eases the first stage of ignition such that the laser input may be reduced by a factor of 2. A very thin shell and small quantity will accomplish the desired result. This uranium is believed to inhibit the fusion process causing it to go longer, thus increasing the fuel burn-up. Also, the uranium is believed to actually feed energy to the fusion process, thus increasing the heat at the outside and at the center of the fuel while maintaining a high external pressure which retards the disassembly of the fuel system.

It is known that the yield from imploded fuel in a fusion process is limited by the disassembly of the fuel. This disassembly can be retarded by the use of as massive and dense a tamper as possible. The use of the uranium tamper increases the tamping effectiveness since it becomes strongly heated by the reaction flux from the burning fuel and expands inwardly retarding the fuel expansion and, under optimum conditions, causing recompression of the fuel. There is a fission reaction due to the fast fusion neutrons escaping from the fusion fuel and thus $U^{238}$ can be used. The secondary neutron flux from the fast fission can also have some additional effect in causing secondary fission.

While the effect of the use of the uranium tamper may enhance the burning of all fusion fuels such as deuterium-tritium, etc., it is especially effective with Lithium deuterium-Lithium tritium (LiDT) which is solid under non-cryogenic conditions and thus easier to handle. One example of a successful burn by computational results has been obtained by a configuration illustrated in the drawing where a fuel sheel of LiDT is surrounded by a thin uranium shell with an outer shell of of aluminum. The configuration, characteristics and output are set forth below:

Configuration

Outer radius of one millimeter
Outer shell of Al with 7.0 micron thickness
Uranium shell of 0.65 micron thickness
Fuel shell of LiDT with 8.9 micron thickness
Laser Flux:
$\phi_0(0.017 + 0.031\tau)$ if $\tau \leq 25$
$\phi_0(-1.708 + 0.1\tau)$ if $\tau > 25$
$\phi_0 = 14.0625 \times 10^{19}$ erg/steradian sec
$\tau =$ time in $10^{-10}$ sec

Characteristics

Average fuel and tamper velocity of collapse time: $5.7 \times 10^7$ cm/sec
Collapse time: 4.177 nanoseconds
Time of maximum burning rate: 4.345 nanoseconds
Laser energy incident: 588 kilojoules
Laser energy absorbed: 513 kilojoules
Energy in implosion (inward moving material at collapse time): 52 kilojoules

Output

Fusion yield: 1.235 megajoules
Fraction of fuel burned: 0.158
Overall fusion energy multiplication: 2.1
Implosion energy multiplication: 23.7
Fission yield: 164 kilojoules
Overall energy multiplication: 2.38

The outer shell in the above example is aluminum but it might also be beryllium.

The presence of the uranium gives significant fission yield and approximately doubles the fusion yield. While the use of the uranium tamper layer in the fuel configuration will introduce some contamination in the products of the burn, this can be satisfactorily contained under circumstances where this is necessary. On the other hand, the laser requirements are greatly reduced and simplified for first stage ignition and burn systems.

The laser input can also be improved and the system rendered more efficient by shaping the pulse of the laser.

The ignition and efficient burn of D-T thermonuclear fuel requires bringing the fuel to high compression (50-200 grams/cm$^3$) at a temperature of a few kilovolts. This is best accomplished if the fuel is not strongly heated by the initial shock resulting from the laser deposition but is accelerated gradually by the laser-produced pressure. The average pressure is fixed by the implosion velocity required to bring the fuel to ignition temperature. The desired sequence of acceleration can be brought about by increasing the laser power monotonically from an initial low value which is set to give the desired level of initial shock. Calculations show that a linear rise with time is effective, increasing the yield by a factor of two or three. Thus, the laser flux should vary as $\phi(t) = (1 + \alpha t)$
$\phi_o$ = initial flux level
$\alpha$ = constant Values found to be effective for DT implosion of a 1 millimeter DT shell contained in a beryllium absorbing layer are $\phi_o = 1.5625 \times 10^{19}$ erg/steradian sec.
$\alpha = 0.04$ Other pulse forms may be used which will be equally effective or better, such as $\phi(t) = \phi_o \exp \alpha t$ The proper choice of the pulse form must be done by computer runs in which the form is varied to give maximum yield.

What is claimed is:

1. A method of increasing the efficiency of a fusion burn of a small quantity of fusion fuel which comprises:
   (a) surrounding the fusion fuel with a contiguous envelope of uranium,
   (b) encasing the fuel and the uranium envelope in a contiguous layer of a relatively light material selected from aluminum and beryllium,
   (c) directing a laser beam toward said fuel to cause a transfer of fast neutrons from said fuel to said uranium and a fission reaction in said uranium to heat said fuel and maintain a high pressure on said fuel to retard the disassembly of the fusion fuel.

2. A fuel configuration for a fusion burn utilizing a laser beam as an energy source which comprises:
   (a) a core of deuterium-tritium having a radius of about 1 millimeter,
   (b) a contiguous envelope of uranium around said core, and
   (c) a contiguous encasement of relatively light material selected from aluminum and beryllium.

3. A fuel configuration for a fusion burn utilizing a laser beam as an energy source which comprises:
   (a) a core of lithium deuterium-lithium tritium having a radius of about 1 millimeter,
   (b) a contiguous envelope of uranium around said core, and
   (c) an encasement of relatively light material selected from aluminum and beryllium around said uranium.

4. A fuel configuration for a fusion burn utilizing a laser beam as an energy source which comprises:
   (a) a core of deuterium-tritium having a radius of about 1 millimeter,
   (b) a contiguous envelope of uranium around said core having a thickness of 0.65 microns, and
   (c) an encasement of relatively light material selected from aluminum and beryllium surrounding and in contact with said uranium.

5. A fuel configuration for a fusion burn utilizing a laser beam as an energy source which comprises:
   (a) a core of deuterium-tritium having a radius of about 1 millimeter,
   (b) a contiguous envelope of uranium around said core having a thickness of 0.65 microns, and
   (c) an encasement of aluminum around said uranium having a thickness of 7.0 microns.

6. A fuel configuration for a fusion burn utilizing a laser beam as an energy source which comprises:
   (a) a core of lithium deuterium-lithium tritium in the form of a shell having a radius under 1 mm and a thickness of 8.9 microns,
   (b) an envelope of uranium around the outer surface of said core, and
   (c) an encasement of relatively light material selected from aluminum and beryllium surrounding and in contact with said uranium.

7. A fuel configuration for a fusion burn utilizing a laser beam as an energy source which comprises:
   (a) a core of lithium deuterium-lithium tritium in the form of a shell having a radius under 1 mm and a thickness of 8.9 microns,
   (b) an envelope of uranium facing the outer surface of said core, and
   (c) an encasement of aluminum on said uranium having a radius of about 1 mm and a thickness of 7.0 microns.

* * * * *